(12) United States Patent
Brown

(10) Patent No.: US 7,752,868 B1
(45) Date of Patent: Jul. 13, 2010

(54) REFRIGERATION UNIT DRAINING SYSTEM

(76) Inventor: Leon Q. Brown, 5157 Damon Dr., Richmond, VA (US) 23234

( * ) Notice: Subject to any disclaimer, the term of this patent is extended or adjusted under 35 U.S.C. 154(b) by 600 days.

(21) Appl. No.: 11/681,282

(22) Filed: Mar. 2, 2007

(51) Int. Cl.
*F25B 43/04* (2006.01)
*A23L 3/36* (2006.01)

(52) U.S. Cl. .......................... 62/475; 62/303

(58) Field of Classification Search .......... 62/150, 62/277, 208, 285, 288, 291, 294, 303, 475, 62/571, 84, 115, 117, 191, 149, 228.1, 470, 62/471, 515; 165/95, 70, 71; 184/6.5, 106; 220/571

See application file for complete search history.

(56) References Cited

U.S. PATENT DOCUMENTS

| | | | |
|---|---|---|---|
| 4,379,712 A * | 4/1983 | Sperr et al. .................... 96/294 |
| 5,238,502 A | 8/1993 | Jenkins | |
| 5,410,891 A * | 5/1995 | Ripert ........................ 62/286 |
| 5,499,639 A | 3/1996 | Williams, Jr. | |
| 6,041,611 A | 3/2000 | Palmer | |
| 6,405,549 B1 * | 6/2002 | Baffes ........................ 62/188 |
| D485,283 S | 1/2004 | Shuck | |
| 6,679,076 B1 * | 1/2004 | Duga et al. ................ 62/228.1 |
| 2004/0250841 A1 | 12/2004 | Kimbrough et al. | |
| 2005/0236013 A1 | 10/2005 | Huston et al. | |

* cited by examiner

*Primary Examiner*—Frantz F. Jules
*Assistant Examiner*—Emmanuel Duke

(57) ABSTRACT

A refrigeration unit draining system for receiving and directing liquid used to clean a refrigeration unit to a desired disposal area includes a plurality of collectors. Each of the collectors is coupled to a refrigeration unit. Each of the collectors collects liquid introduced into the refrigeration unit and directs the liquid to a desired disposal area. The plurality of collectors includes a pair of inlet collectors. One of the inlet collectors is positioned over an inlet of a condenser housing and the other of the inlet collectors is positioned over an inlet of an evaporator housing. The plurality of collectors includes a pair of outlet collectors. One of the outlet collectors is positioned adjacent an outlet of the condenser housing and the other of the outlet collectors is positioned adjacent an outlet of the evaporator housing.

8 Claims, 7 Drawing Sheets

REFRIGERATION UNIT DRAINING SYSTEM

BACKGROUND OF THE INVENTION

1. Field of the Invention

The present invention relates to refrigeration unit flushing systems and more particularly pertains to a new refrigeration unit flushing system for receiving and directing liquid used to clean a refrigeration unit to a desired disposal area.

2. Description of the Prior Art

The use of refrigeration unit flushing systems is known in the prior art. While these devices fulfill their respective, particular objectives and requirements, the need remains for a system has certain improved features to seal one end of a refrigeration unit to inhibit the liquid draining out of the unit during cleaning. Additionally, the system should partially cover the other end of the refrigeration unit to permit the introduction of the liquid and the collection of the liquid draining out.

SUMMARY OF THE INVENTION

The present invention meets the needs presented above by generally comprising a plurality of collectors. Each of the collectors is coupled to a refrigeration unit. Each of the collectors collects liquid introduced into the refrigeration unit and directs the liquid to a desired disposal area. The plurality of collectors includes a pair of inlet collectors. One of the inlet collectors is positioned over an inlet of a condenser housing and the other of the inlet collectors is positioned over an inlet of an evaporator housing. The plurality of collectors includes a pair of outlet collectors. One of the outlet collectors is positioned adjacent an outlet of the condenser housing and the other of the outlet collectors is positioned adjacent an outlet of the evaporator housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a perspective view of the other one of the outlet covers of the present invention.

DESCRIPTION OF THE PREFERRED EMBODIMENT

Figure 1:
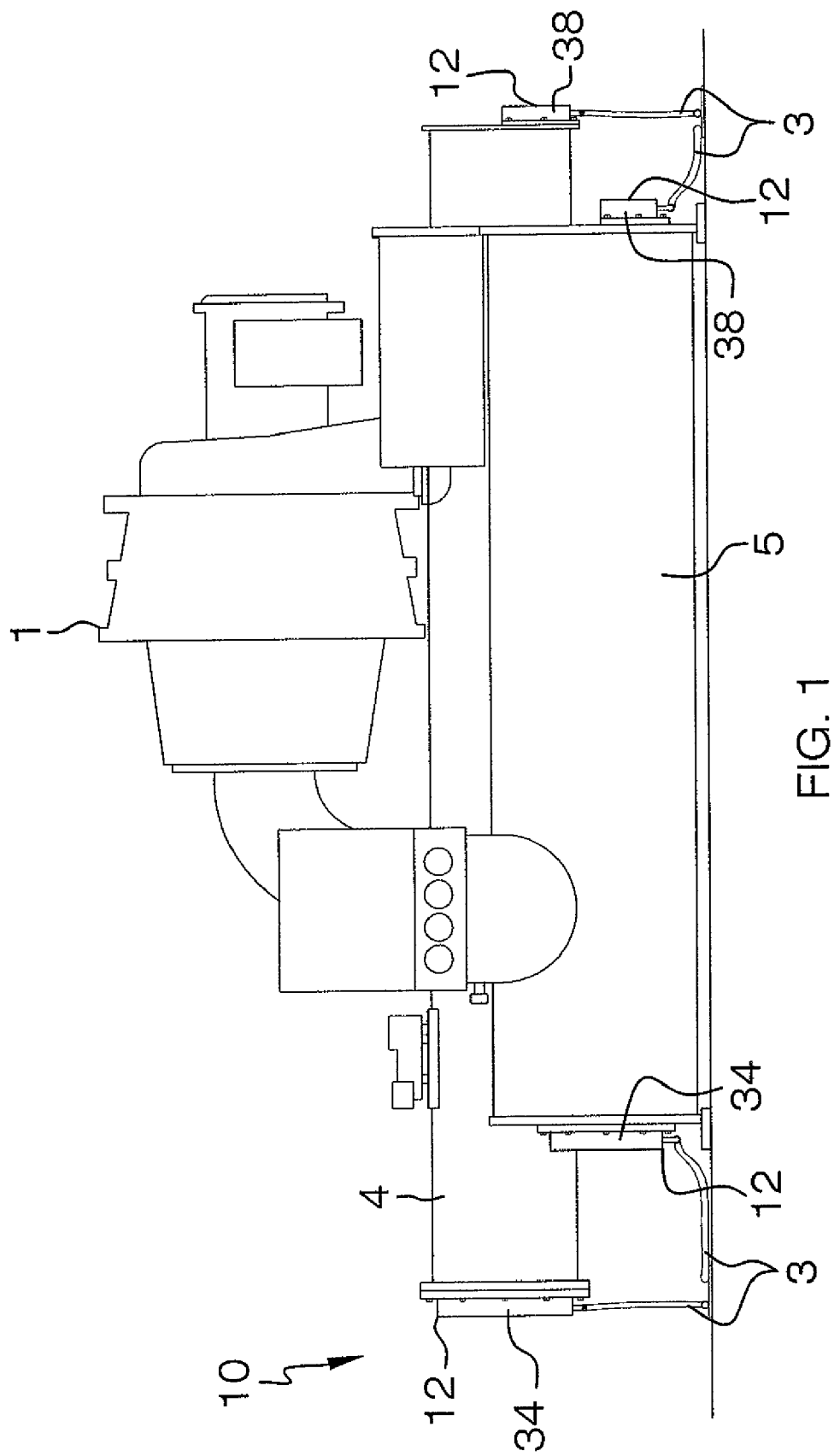
FIG. 1 is a side view of a refrigeration unit draining system according to the present invention shown in use.
Figure 2:
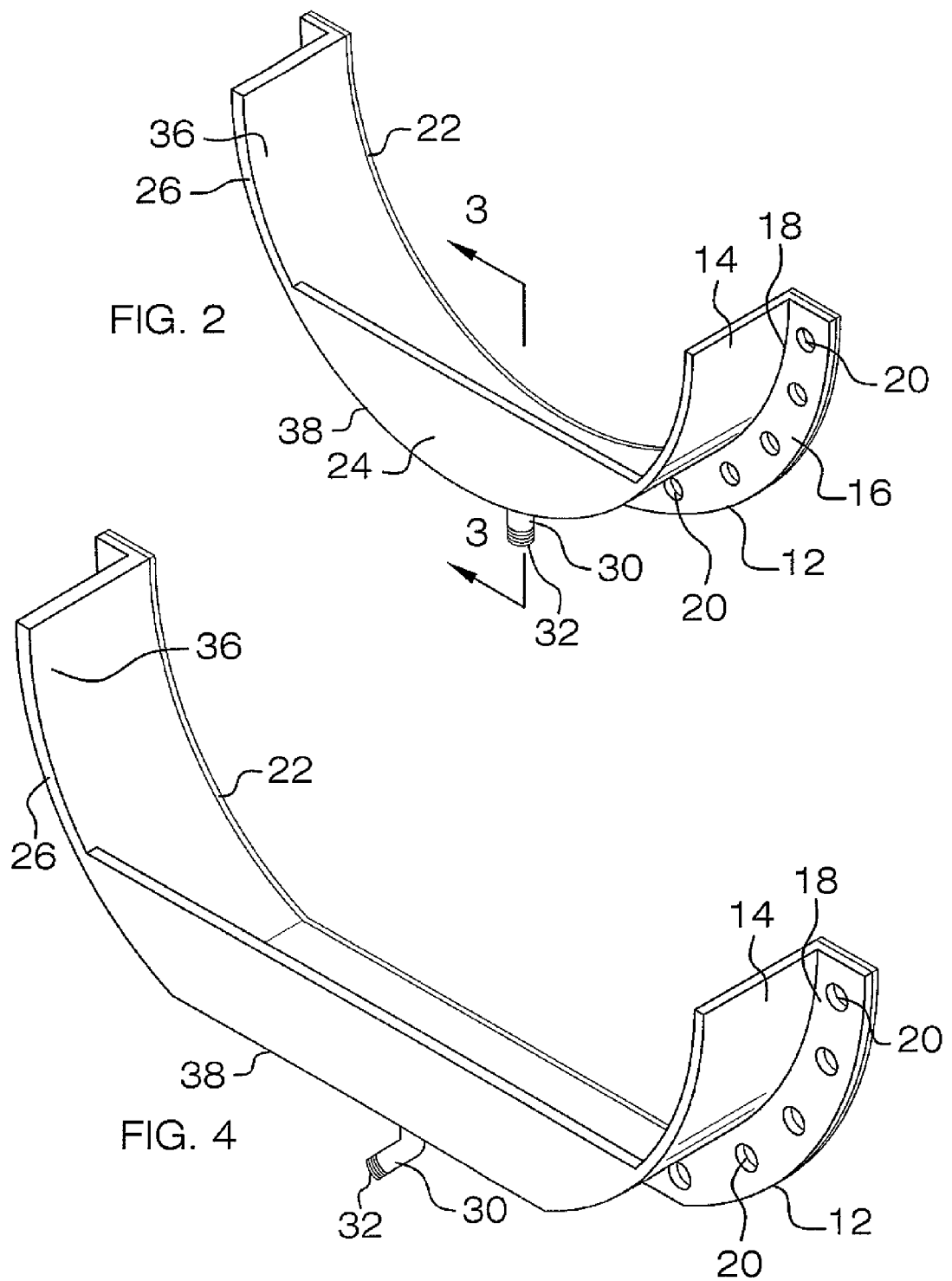
FIG. 2 is a perspective view of one of the outlet covers of the present invention.
Figure 3:
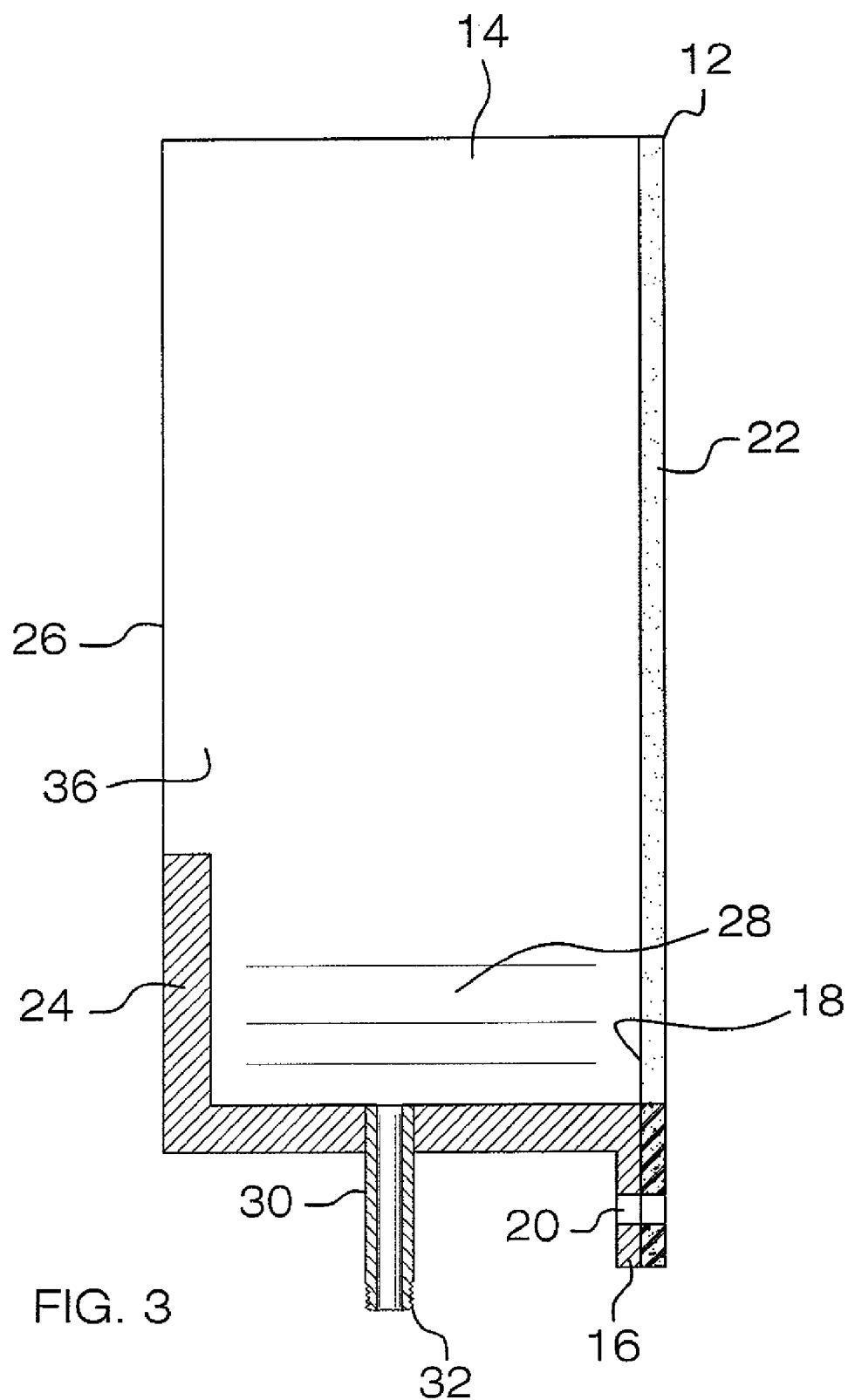
FIG. 3 is a cross-sectional view of the present invention taken along line 3-3 of FIG. 2.
Figure 5:
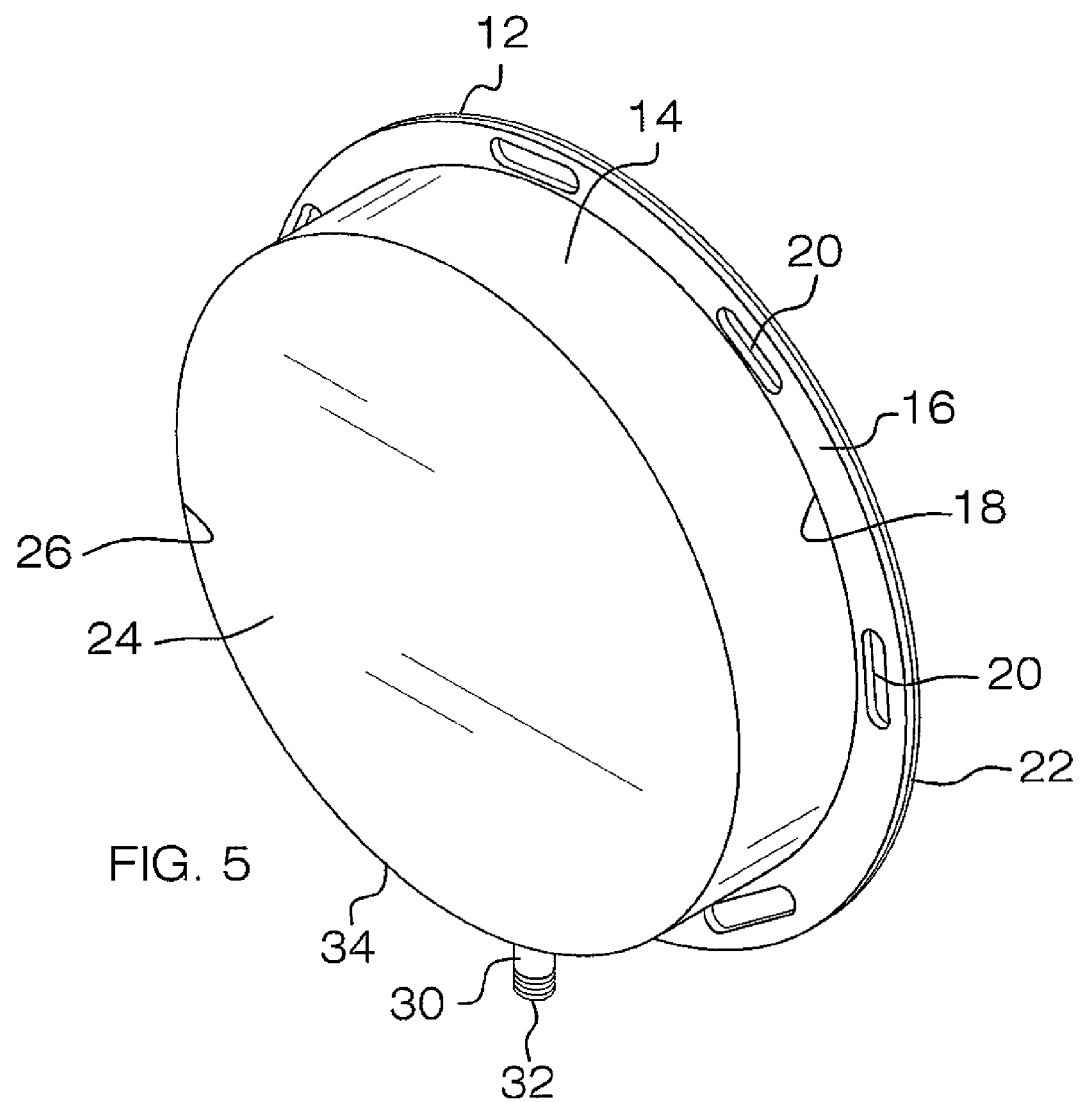
FIG. 5 is a perspective view of one of the inlet covers of the present invention.
Figure 6:
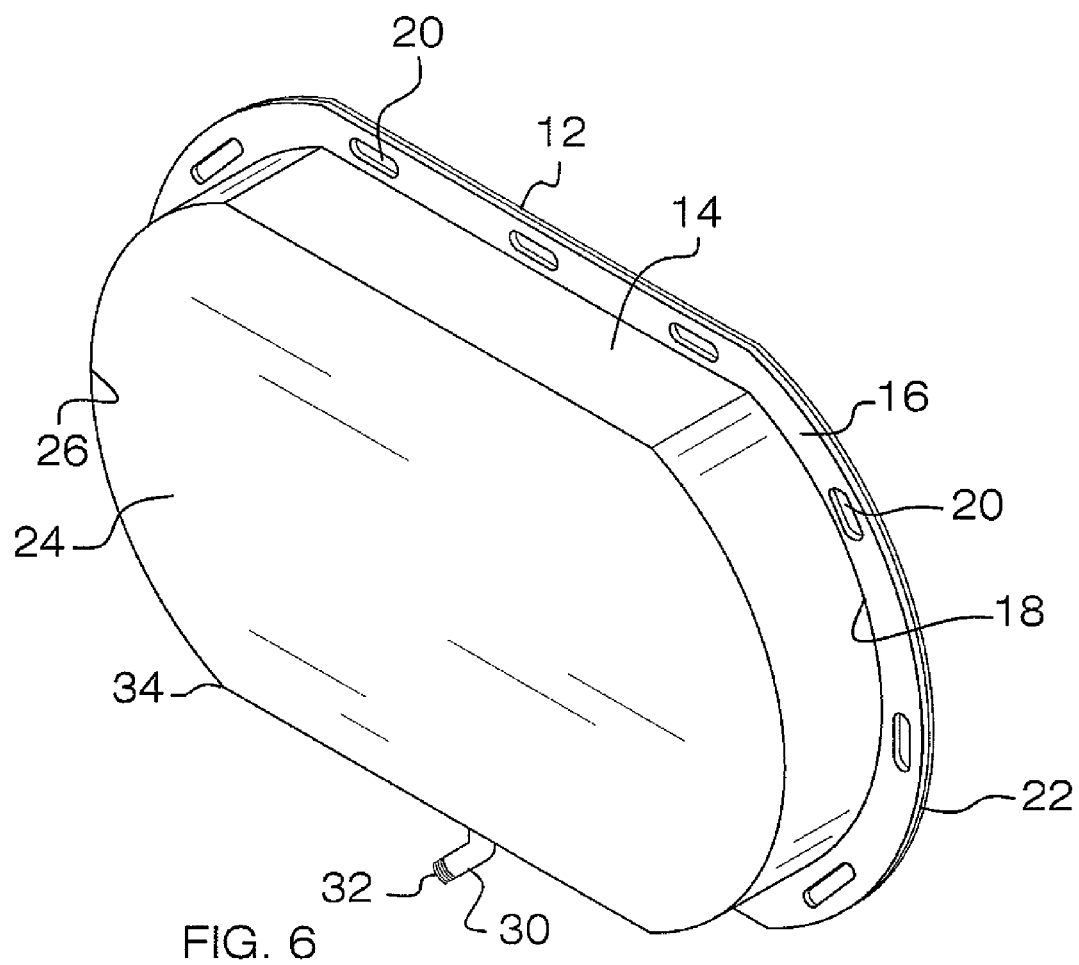
FIG. 6 is a perspective view of the other one of the inlet covers of the present invention.
Figure 7:
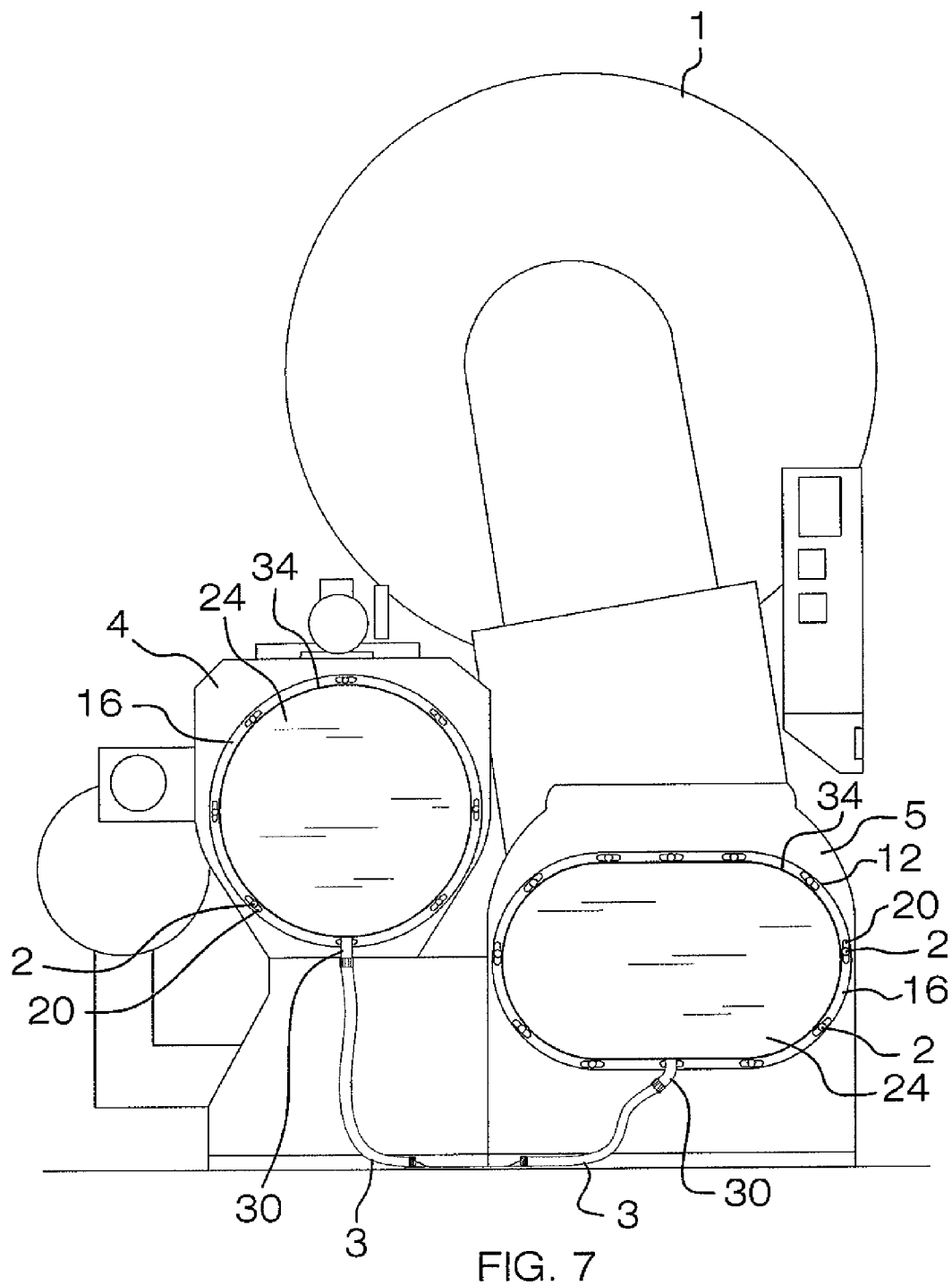
FIG. 7 is a front view of the inlet covers of the present invention show in place on the refrigeration unit.
Figure 8:
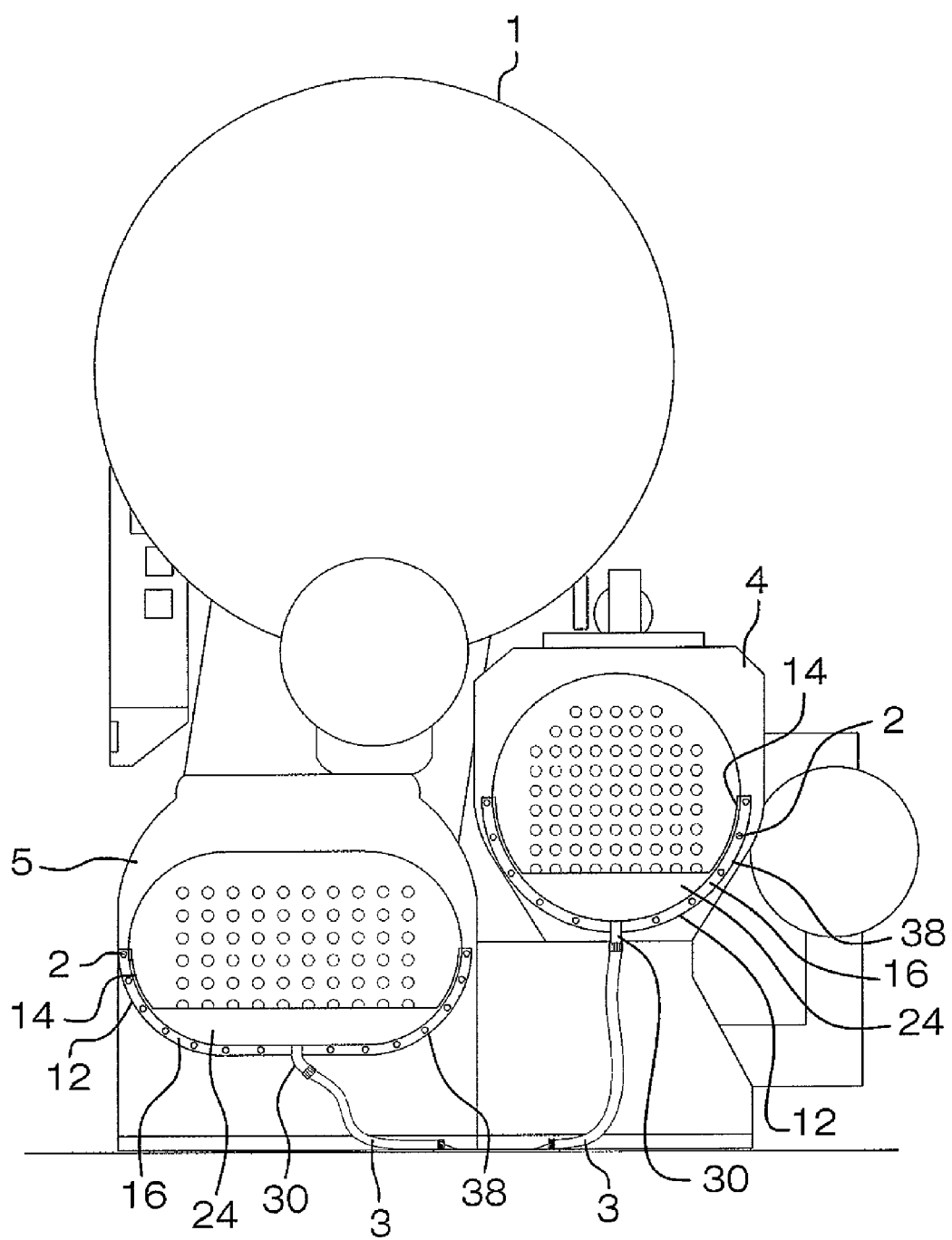
FIG. 8 is a rear view of the outlet covers of the present invention shown in place on the refrigeration unit.

With reference now to the drawings, and in particular to FIGS. 1 through 8 thereof, a new refrigeration unit flushing system embodying the principles and concepts of the present invention and generally designated by the reference numeral 10 will be described.

As best illustrated in FIGS. 1 through 8, the refrigeration unit draining system 10 generally comprises a plurality of collectors 12. Each of the collectors 12 is coupled to a refrigeration unit 1. Each of the collectors 12 collects liquid introduced into the refrigeration unit 1 and directs the liquid to a desired disposal area. Each of the collectors 12 includes a rim 14 being positioned against an external face of the refrigeration unit 1. A flange 16 is coupled to an interior edge 18 of the rim 14. The flange 16 extends outwardly from and is coextensive with the interior edge 18 of the rim 14. The flange 16 has a plurality of mounting apertures 20 extending therethrough. Each of the mounting apertures 20 permits one of a plurality of fasteners 2 to be extended therethrough to mount the flange 16 and the rim 14 to the refrigeration unit 1.

Each of the collectors 12 also includes a gasket 22 coupled to the flange 16. The gasket 22 is positioned between the flange 16 and the refrigeration unit 1 to inhibit the liquid leaking between the flange 16 and the refrigeration unit 1. An outer wall 24 is coupled to an exterior edge 26 of the rim 14. The outer wall 24 inhibits at least a portion of the liquid from draining over the exterior edge 26 of the rim 14. The rim 14 and the outer wall 24 define a collection space 28 for receiving the liquid draining from the refrigeration unit 1.

Each of the collectors 12 additionally includes a drainage fitting 30 coupled to and extending downwardly from the rim 14. The drainage fitting 30 is in fluid communication with the collection space 28 to receive the liquid draining from the refrigeration unit 1. A free end 32 of the drainage fitting 30 receives a hose 3 to direct the liquid draining through the drainage fitting 30 to the disposal area.

The plurality of collectors 12 includes a pair of inlet collectors 34. One of the inlet collectors 34 is positioned over an inlet of a condenser housing 4 and the other of the inlet collectors 34 is positioned over an inlet of an evaporator housing 5. The outer wall 24 of each of the inlet collectors 34 is coextensive with the exterior edge 26 of the rim 14 to close an open outer end 36 of the rim 14 and inhibit the liquid exiting over the outer wall 24.

The plurality of collectors 12 includes a pair of outlet collectors 38. One of the outlet collectors 38 is positioned adjacent an outlet of the condenser housing 4 and the other of the outlet collectors 38 is positioned adjacent an outlet of the evaporator housing 5. The rim 14 and the outer wall 24 of each of the outlet collectors 38 extend over a portion of the associated one of the outlets to permit the liquid to be introduced into the refrigeration unit 1 through the associated one of the outlets.

In use, the inlet collectors 34 are positioned over the inlets of the condenser housing 4 and the evaporator housing 5. The fasteners 2 are extended through the flange 16 and secured to the respective inlet to secure said inlet collectors 34 to the inlets. The outlet collectors 38 are positioned adjacent the outlets of the condenser housing 4 and the evaporator housing 5 and the fasteners 2 extended through the flange 16 of the outlet covers to secure the outlet collectors 38 to their respective outlets. The liquid is then sprayed into the outlets of the evaporator housing 5 and the condenser housing 4 to clean the refrigeration unit 1. As the liquid collects in the refrigeration unit 1 and drains through the outlets and the inlets the collectors 12 receive the liquid and direct the liquid to the desired disposal area.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A refrigeration unit draining system for collecting liquid used in servicing a refrigeration unit, said system comprising: a plurality of collectors, each of said collectors being coupleable to the refrigeration unit, each of said collectors includes a rim being positioned against an external face of the refrigeration unit, each of said collectors includes a flange being coupled to an interior edge of said rim, said flange extending outwardly from and being coextensive with said interior edge of said rim, said flange has a plurality of mounting apertures extending therethrough, each of said mounting apertures permitting one of a plurality of fasteners to be extended therethrough to mount said flange and said rim to said refrigeration unit, and each of said collectors collecting liquid introduced into the refrigeration unit to clean the refrigeration unit and directing the liquid to a desired disposal area; said plurality of collectors including a pair of inlet collectors, one of said inlet collectors being positioned over an inlet of a condenser housing and the other of said inlet collectors being positioned over an inlet of an evaporator housing; and said plurality of collectors including a pair of outlet collectors, one of said outlet collectors being positioned adjacent an outlet of the condenser housing and the other of said outlet collectors being positioned adjacent an outlet of the evaporator housing.

2. The system according to claim 1, wherein each of said collectors includes a gasket being coupled to said flange, said gasket being positioned between said flange and the refrigeration unit to inhibit the liquid leaking between said flange and the refrigeration unit.

3. The system according to claim 1, wherein each of said collectors includes an outer wall being coupled to an exterior edge of said rim, said outer wall inhibiting at least a portion of the liquid from draining over said exterior edge of said rim, said rim and said outer wall defining a collection space for receiving the liquid draining from the refrigeration unit.

4. The system according to claim 3, wherein said outer wall of each of said inlet collectors is coextensive with said exterior edge of said rim to close an open outer end of said rim and inhibit the liquid exiting over said outer wall.

5. The system according to claim 3, wherein said rim and said outer wall of each of said outlet collectors extends over a portion of the associated one of the outlets to permit the liquid to be introduced into the refrigeration unit through the associated one of said outlets.

6. The system according to claim 3, wherein each of said collectors includes a drainage fitting being coupled to and extending downwardly from said rim, said drainage fitting being in fluid communication with said collection space to receive the liquid draining from the refrigeration unit.

7. The system according to claim 6, wherein said drainage fitting includes a free end, said free end receiving a hose to direct the liquid draining through said drainage fitting to the disposal area.

8. A refrigeration unit draining system for collecting liquid used in servicing a refrigeration unit, said system comprising:
a plurality of collectors, each of said collectors being coupleable to the refrigeration unit, each of said collectors collecting liquid introduced into the refrigeration unit to clean the refrigeration unit and directing the liquid to a desired disposal area, each of said collectors including;
a rim being positioned against an external face of the refrigeration unit;
a flange being coupled to an interior edge of said rim, said flange extending outwardly from and being coextensive with said interior edge of said rim, said flange having a plurality of mounting apertures extending therethrough, each of said mounting apertures permitting one of a plurality of fasteners to be extended therethrough to mount said flange and said rim to said refrigeration unit;
a gasket being coupled to said flange, said gasket being positioned between said flange and the refrigeration unit to inhibit the liquid leaking between said flange and the refrigeration unit;
an outer wall being coupled to an exterior edge of said rim, said outer wall inhibiting at least a portion of the liquid from draining over said exterior edge of said rim, said rim and said outer wall defining a collection space for receiving the liquid draining from the refrigeration unit;
a drainage fitting being coupled to and extending downwardly from said rim, said drainage fitting being in fluid communication with said collection space to receive the liquid draining from the refrigeration unit, a free end of said drainage fitting receiving a hose to direct the liquid draining through said drainage fitting to the disposal area;
said plurality of collectors including a pair of inlet collectors, one of said inlet collectors being positioned over an inlet of a condenser housing and the other of said inlet collectors being positioned over an inlet of an evaporator housing, said outer wall of each of said inlet collectors being coextensive with said exterior edge of said rim to close an open outer end of said rim and inhibit the liquid exiting over said outer wall; and
said plurality of collectors including a pair of outlet collectors, one of said outlet collectors being positioned adjacent an outlet of the condenser housing and the other of said outlet collectors being positioned adjacent an outlet of the evaporator housing, said rim and said outer wall of each of said outlet collectors extending over a portion of the associated one of the outlets to permit the liquid to be introduced into the refrigeration unit through the associated one of said outlets.

* * * * *